United States Patent

Wurzel

[15] 3,680,935
[45] Aug. 1, 1972

[54] RETAINING ASSEMBLY FOR TAPERED ROLLER BEARINGS

[72] Inventor: Hugo Wurzel, Rego Park, N.Y.

[73] Assignee: Waldes Rochinoor, Inc., Long Island City, N.Y.

[22] Filed: Jan. 22, 1970

[21] Appl. No.: 4,897

[52] U.S. Cl.............308/218, 287/DIG. 7, 308/236
[51] Int. Cl..............................................F16c 33/00
[58] Field of Search..............308/218, 197, 207, 236; 287/DIG. 7; 85/8.8, 50

[56] References Cited

UNITED STATES PATENTS

| | | | |
|---|---|---|---|
| 1,418,379 | 6/1922 | Karle | 287/DIG. 7 |
| 2,509,081 | 5/1950 | Bluth et al. | 287/DIG. 7 |
| 2,595,787 | 5/1952 | Heimann | 287/DIG. 7 |

FOREIGN PATENTS OR APPLICATIONS 192,196  10/1957  Austria.........................287/207

*Primary Examiner*—Houston S. Bell, Jr.
*Attorney*—J. Harold Kilcoyne

[57] ABSTRACT

A retaining assembly providing a simplified means and procedure for mounting tapered roller bearings on a shaft in a manner as also insures accurate bearing setting. Said assembly includes a plain metal washer which is located by and held tight and square against the conventional shoulder provided on the shaft which is to receive such a bearing just outwardly of its journal portion by the axial biasing action which a beveled retaining ring sprung into a circumferential groove provided therefor in the shaft just outwardly of said outer shoulder exerts thereon in tending to contract to its unstressed diameter (cf. U.S. Pat. No. 2,509,081, dated May 23, 1950).

7 Claims, 10 Drawing Figures

INVENTOR
HUGO WURZEL,
ATTORNEY

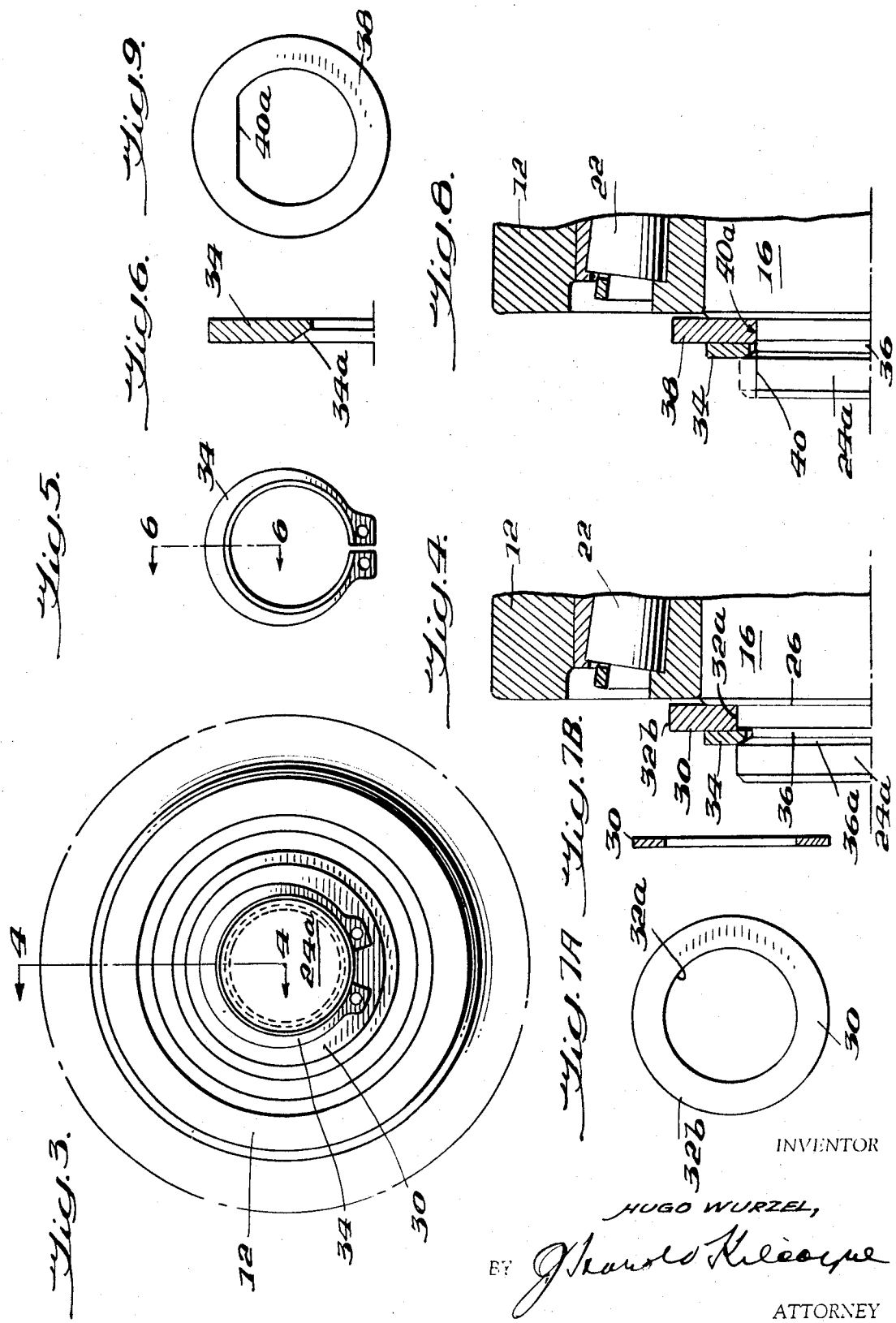

RETAINING ASSEMBLY FOR TAPERED ROLLER BEARINGS

BACKGROUND OF THE INVENTION

It is well known to those skilled in the particular art that to get maximum bearing life from bearings, and particularly tapered roller bearings comprising axially-spaced sets of oppositely tapered roller bearings in which correspondingly axially-spaced stepped diameter shaft portions are journaled, as are used in many and varied shaft applications, it is necessary to have accurate bearing setting. That is to say, tapered roller bearings set without proper running clearance, either too tight or too loose, between the outer-end face thereof and such bearing retention means as is employed, will not give the life that was designed into them. Conversely, proper bearing setting insures equal load distribution over all the work bearing surfaces and hence makes for longer bearing life.

In the past, the setting of tapered roller bearings on shafts was considered to be a job to be undertaken only by experienced personnel employing special measuring devices designed to insure accurate setting, and thus accurate initial setting and subsequent resettings of such bearings on the journal portion of a shaft as might be required in the field was very difficult if not altogether impossible of attainment.

More recently, however, it became more or less standard practice in the art to effect the mounting of tapered roller bearings on a shaft and at the same time to achieve accurate setting thereof by providing the shaft with a reduced-diameter, outer-end length portion which is separated from the journal portion thereof on which the bearing is directly mounted by a right-angular shoulder disposed at a distance outwardly from an inner reference shoulder usually also provided on the shaft to define the innermost line of the bearing sets, which is greater than the overall width of the bearing by the small amount which exactly equals the running clearance to be provided the bearing according to the particular design requirements of the installation. A thread cut in the peripheral surface of said reduced-diameter outer-end portion of the shaft for the length thereof provides for the threading thereon of a self-locking nut which is run squarely up against the aforesaid outer shoulder, thus to provide not only a bearing retention means but also a shoulder so located as to provide the proper running clearance between the outer-end face of the bearing and said retention means (screw-on nut).

SUMMARY OF THE INVENTION

The retaining-ring assembly and the procedure for mounting tapered roller bearings on shafts in a manner as insures accurate bearing setting according to the present invention also requires a reduced-diameter outer-end portion on the shaft, the provision of which forms a shaft shoulder at the same developed distance from the bearing reference shoulder as establishes the proper running clearance between the bearing retention means and the outer end of the bearing, as just explained in connection with the prior method using a screw-on lock-nut form of bearing retention means. However, the herein invention provides for the retention and accurate setting of the bearing by a plain metal washer which in installation is simply slipped over the reduced-diameter end portion of the shaft and shifted axially therealong to a position in which it abuts square against said outer-shaft shoulder, in which position it is positively and forcefully retained by a beveled retaining ring sprung into a circumferential groove provided therefor in the periphery of the reduced-diameter shaft-end portion just outwardly of the so-positioned washer, and which, in tending to contract to its unstressed state, exerts a substantial force in axial direction against the outer face of said washer as positively holds it against said shoulder.

Advantages of the aforesaid beveled retaining ring-washer means for retaining tapered roller bearings as herein proposed on their shafts over the present lock-nut form of bearing retaining means are as follows: A much shorter length of reduced-diameter shaft end and no screw threading of said shaft end is required; the replacement of the lock-nut retention means by a simple inexpensive stamped washer, the tolerances in the thickness of which can be held to commercial sheet-metal tolerances since the beveled retaining ring component of the retention means has only to take up these tolerances and the groove-location tolerances which a properly designed beveled retaining ring can easily do; and the ability of the retaining ring and washer form of bearing retention means of the invention to perform as intended time-after-time even under field conditions.

For detailed explanation of the major structural features of the invention, reference is had to the accompanying illustrative drawings which are to be read in light of the following written description, in which:

FIG. 3 is a front-end elevation of the mounted tapered roller bearing assembly illustrated in FIG. 2;

FIG. 4 is an enlarged fragmentary view, partly in section, taken along line 4—4 of FIG. 3;

FIG. 5 is a front elevation looking on to the beveled retaining ring component of the bearing retention means as employed in FIGS. 2-4, and FIG. 6 is an enlarged section taken on line 5—5 of FIG. 5;

FIGS. 7A and 7B are front elevation and vertical sections, respectively, of the washer component of the bearing retention means employed in FIGS. 2-4;

FIG. 8 is a part-sectional view similar to FIG. 4 but employing an optional configuration of the washer and shaft end useful in preventing relative rotation between washer and shaft in applications where loading conditions are on the high side; and FIG. 9 is a front elevation of the modified washer employed in the bearing mounting assembly of FIG. 8.

Figure 1:
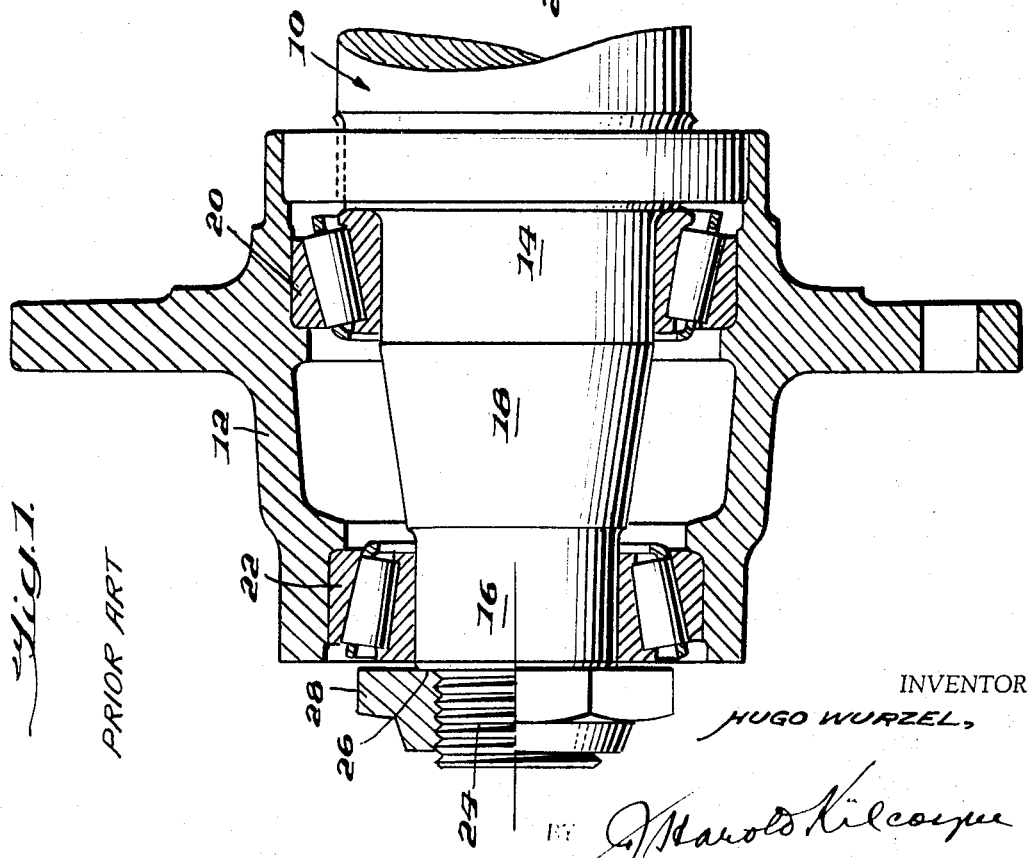
FIG. 1 is a side elevation, partially in section, illustrative of a tapered roller bearing mounted on a shaft according to the prior art means and method therefor.

For a proper understanding of the simplified means and the procedure made possible thereby for mounting tapered roller bearings as used in numerous and varied shaft applications as are provided by the present invention, such will be described against the present widely used means illustrated in FIG. 1. More particularly, reference numeral 10 (FIG. 1) designates the bearing-journaled end of a shaft which extends into a hollow housing 12, which includes axially spaced, stepped-diameter journal portions 14, 16 interconnected by a tapered portion 18. The stepped-diameter journal portions 14, 16 are journaled for relative rotation in the inner races of correspondingly spaced, tapered roller sets generally designated 20, 22, the outer races of which have press fit in the bore-wall surface of the housing 12.

Said shaft 10 is provided at its relatively outer end with a reduced-diameter end portion 24, the reduction in diameter of which results in the formation of an outer right-angular shoulder 26 which, as previously explained, is so located along the length of the shaft that when bearing retention means operating as a shoulder is positioned square against same, proper running clearance for the tapered roller bearing assembly is also insured. Also, as earlier stated, the bearing retention means employed in the prior-art bearing mounting means shown in FIG. 1 comprises a lock nut 28 which is threaded on to the reduced diameter end of the shaft (for which purpose said shaft end is provided with screw threads throughout substantially its full length) to a position in which it is disposed tight and square against said shoulder 26.

From the description up to this point, it will be seen that the present method of mounting a tapered roller bearing on the outer-end journal portion of a shaft, axle and the like requires the provision of an exteriorly threaded, reduced-end portion of substantial axial length at the extreme outer end of said shaft, plus the provision of bearing retention means in the form of a lock nut which must be carefully threaded thereon to prevent cross-threading of the threads of each and thereafter run up square and wrenched tight against the outer shoulder 26 of the shaft.

As distinguished therefrom, the bearing retention means of the present invention substitutes for the threaded-on lock nut of the prior bearing mounting means as just described a simple sheet-metal washer capable of being readily slipped over the reduced-diameter end of the shaft 24a and thereupon of being merely pushed axially therealong into engagement with a shaft shoulder corresponding in all respects to the aforementioned shoulder 26, against which it is thereafter positively held by the biasing action exerted thereon in axial inward direction by a beveled retaining ring of the type disclosed in U.S. Pat. No. 2,509,081, dated May 23, 1950, which is sprung into a groove cut or otherwise machined in the reduced-diameter end of the shaft just outwardly of the so-positioned washer.

Figure 2:
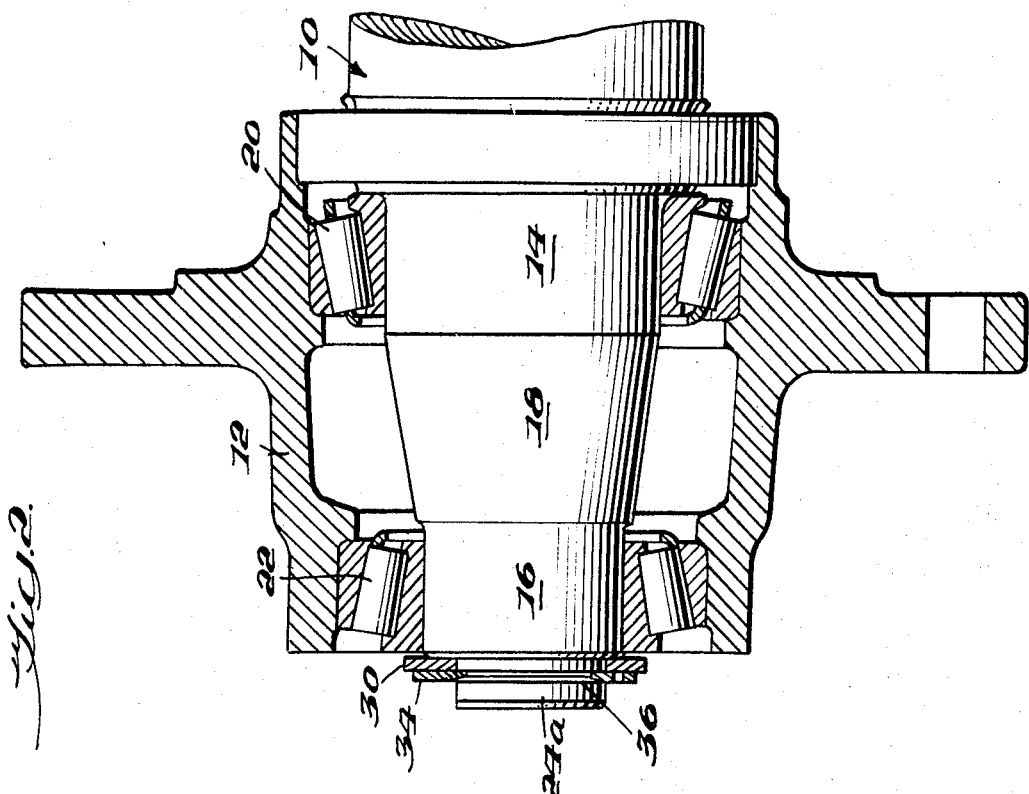
FIG. 2 is a view similar to FIG. 1 but illustrating the simplified beveled retaining ring and washer means serving to mount a tapered roller bearing in the shaft according to the present invention.

More particularly, and as depicted in FIGS. 2–4 inclusive, illustrative of a bearing retained on a shaft in accurately set position by the simplified retention means of the herein invention, the details of which are illustrated in FIGS. 5–7B inclusive, such retention means comprises a plain sheet-metal washer 30 (FIG. 7A), whose central opening as defined by its inner circular edge 32a has diameter slightly greater than that of the diameter of the reduced-diameter end of the shaft, whereby it can be readily slipped over said end and shifted axially therealong to a position in which it abuts the aforesaid shaft shoulder 26, and whose outer diameter is substantially greater than that of the diameter of the journal portion 16 of said shaft, whereby its outer rim or edge portion 32b projects radially beyond said journal portion, thus to form an artificial shoulder thereon.

Also a feature of the herein invention is that said washer 30 is positively held against said shaft shoulder 26 by force exerted thereon in axial direction by a so-called beveled retaining ring 34 sprung into a circumferential groove 36 provided therefor in the peripheral surface of the reduced-diameter outer-end portion of the shaft at a location along the latter as insures tight interface engagement being established between the relatively inner radial face of said retaining ring 34 and the relatively outer radial face of the washer 30.

As the structure and manner of functioning of a beveled retaining ring (as herein designated 34) when sprung into a shaft groove (as herein designated 36) are well known, such being the subject matter of now expired U.S. Pat. No. 2,509,081, dated May 23, 1950, no detailed description thereof is believed necessary. Suffice it to say, however, that when said ring 34 is sprung into its groove, it is spread and thereby stressed, following which it tends to close circumferentially, i.e. to contract to its unstressed state. Being of so-called beveled construction, said ring 34 is provided on its face which is remote or distant from the washer 30 and along its inner edge with an inclined surface 34a and the side wall 36a of the groove 36 against which said ring surface 34a engages is complementally inclined. Thus, any circumferential closing or contraction of the ring causes it to move in axial direction against the washer 30 with a force which, with proper design of the ring, can be of the magnitude to hold said washer tight against said shaft shoulder 26.

From the above, it will be appreciated that the retaining ring and washer-type bearing retention means as aforesaid provides both a simple and practical means of mounting tapered roller bearings on shafts, as compared to the screw-on lock nut type of bearing retention means of the prior art. Further, and as noted in the foregoing, the retaining ring and washer-type bearing retention means is also less costly than the prior screw-on lock nut means, since its employment requires a much shorter length of reduced-diameter shaft end than does said lock nut means and similarly requires no cutting of threads in the reduced-diameter end of the shaft. Yet another advantage of the bearing retention means of the invention is that the washer which is employed in place of the threaded screw-on lock nut as previously used may be readily and inexpensively fabricated by stamping same in quantity from sheet-metal stock, and in this connection it is worthy of mention that tolerances in the thickness of said sheet-metal stock can be held to commercial sheet-metal tolerances since the beveled retaining ring which is used therewith according to the invention is entirely capable of taking up the tolerances in washer thicknesses as well as in groove location.

Yet another practical feature of the retaining ring and washer-type bearing retention means of the invention is that beveled retaining rings as used therein may be readily assembled and thereafter re-assembled in their grooves, being for this purpose provided with apertured ears with which the tips or points of the plier-type assembly and disassembly tools may be readily coupled. Accordingly, bearing retention means employing such a beveled retaining ring may be disassembled and reassembled time after time even under field conditions, with assurance not only of adequate bearing retention but also of accurate bearing setting.

To provide for the condition of heavy loading which might cause undesirable relative rotation of the washer 30 and possibly also of the retaining ring 34 with respect to the shaft or shaft end, the use of the somewhat modified configuration of shaft and washer inner edge of FIGS. 8 and 9 is suggested. According thereto, the reduced-diameter outer-end portion 24a of the shaft 10 is provided with a "flat" 40 and the washer 38 is provided along its inner edge with a matching "flat" designated 40a which extends as a chord across its otherwise circular inner edge. By the provision of these matching flats, said washer 38 is in effect keyed to the shaft end and is thus restrained against any relative rotation with respect thereto. Otherwise the FIG. 8 form of bearing mounting and retention means is structurally and functionally identical with that previously described in connection with FIGS. 2–4 inclusive.

As many changes could be made in carrying out the above constructions without departing from the scope of the invention, it is intended that all matter contained in the above description or shown in the accompanying drawings shall be interpreted as illustrative and not in a limiting sense.

I claim:

1. Means mounting and accurately "setting" tapered roller bearings for wheels and the like on a shaft provided with a journal portion terminating in a conventionally-located outer shoulder and a reduced-diameter outer-end portion which extends axially beyond said shoulder, comprising: washer means assembled on said reduced-diameter outer-end portion of the shaft and having effective outer diameter greater than that of the immediately adjacent journal portion thereof, and readily removable and replaceable retaining-ring means assembled on said reduced-diameter end of the shaft axially-outwardly of said washer means and exerting continuous axial force in inward direction on said washer means of a magnitude maintaining said washer means in tight abutting engagement against said shoulder, the construction and arrangement being such that said outer-end portion of the shaft is unconventionally non-threaded and of relatively short length and further that proper running clearance is assured.

2. Means according to claim 1, wherein said washer means comprises a stamping of annular shape fashioned from commercial sheet metal whose central opening has diameter slightly greater than that of the shaft outer-end portion whereby it may be assembled and positioned thereon by being slipped over said outer-end portion and shifted axially therealong to an initial shoulder-abutting position as aforesaid.

3. Means according to claim 1, wherein said retaining-ring means comprises a beveled spring-retaining ring assembled and being in stressed condition in a circumferential groove provided therefor in the peripheral surface of said outer-end shaft portion outwardly of said shaft shoulder, said retaining ring in tending to return to its unstressed condition exerting inward axial force on the outer face of said washer means of magnitude as holds said washer means in forceful abutting engagement against said shoulder as aforesaid.

4. Means according to claim 2, and wherein said retaining-ring means comprises a "beveled" spring-retaining ring assembled and being in stressed condition in a circumferential groove provided therefor in the peripheral surface of said outer-end shaft portion outwardly of said shaft shoulder, said retaining ring in tending to return to its unstressed condition exerting inward axial force on the outer face of said washer of magnitude as holds said washer in forceful abutting engagement against said shoulder as aforesaid.

5. Means according to claim 4, and wherein said circumferential groove is defined in part by side walls and one of said side walls has inclination complemental to that of the bevel of said retaining ring, said one side wall cooperating with said bevel in rendering said retaining ring operative to exert inward axial force on the outer face of the washer as aforesaid.

6. Means according to claim 1, wherein said washer means and reduced-diameter outer end of the shaft are provided with cooperating means preventing relative rotation of the washer means with respect to said shaft outer-end portion on which said washer means is mounted.

7. Means according to claim 6, and wherein said last means comprises a "flat" on the surface of the shaft outer end and a mating "flat" on the inner edge of said washer means.

* * * * *

UNITED STATES PATENT OFFICE
CERTIFICATE OF CORRECTION

Patent No. 3,680,935     Dated August 1, 1972

Inventor(s) Hugo Wurzel

It is certified that error appears in the above-identified patent and that said Letters Patent are hereby corrected as shown below:

Column 2, line 48, "5-5" should read -- 6-6 --.

Column 4, line 22, "distant" should read -- distal --. Column 5, line 6, "edge" should read -- edges --. On the cover sheet the assignee should read -- Waldes Kohinoor, Inc. --.

Signed and sealed this 5th day of November 1974.

(SEAL)
Attest:

McCOY M. GIBSON JR.          C. MARSHALL DANN
Attesting Officer            Commissioner of Patents